US012463788B2

(12) United States Patent
Kurita et al.

(10) Patent No.: US 12,463,788 B2
(45) Date of Patent: Nov. 4, 2025

(54) RADIO COMMUNICATION NODE

(71) Applicant: NTT DOCOMO, INC., Tokyo (JP)

(72) Inventors: Daisuke Kurita, Tokyo (JP); Hiroki Harada, Tokyo (JP); Weiqi Sun, Beijing (CN); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 466 days.

(21) Appl. No.: 17/995,533

(22) PCT Filed: Apr. 9, 2020

(86) PCT No.: PCT/JP2020/016043
§ 371 (c)(1),
(2) Date: Oct. 5, 2022

(87) PCT Pub. No.: WO2021/205626
PCT Pub. Date: Oct. 14, 2021

(65) Prior Publication Data
US 2023/0155802 A1 May 18, 2023

(51) Int. Cl.
*H04L 5/00* (2006.01)
*H04W 72/0453* (2023.01)
(52) U.S. Cl.
CPC ............ *H04L 5/0098* (2013.01); *H04L 5/001* (2013.01); *H04L 5/0048* (2013.01); *H04W 72/0453* (2013.01)
(58) Field of Classification Search
CPC ..... H04L 5/001; H04L 5/0048; H04L 5/0098; H04W 72/0453
See application file for complete search history.

(56) References Cited

PUBLICATIONS

Office Action issued in counterpart Japanese Patent Application No. 2022-513821 mailed on May 28, 2024 (6 pages).
Office Action issued in counterpart Chinese Patent Application No. 202080099488.1 mailed on Jun. 13, 2024 (13 pages).
LG Electronics Inc.; "Remaining issues on Timing Delta MAC CE"; 3GPP TSG-RAN WG2 Meeting #109 electronic, R2-2001558; Elbonia; Feb. 24-Mar. 6, 2020 (2 pages).
3GPP TS 38.213 V16.1.0; "3rd Generation Partnership Project; Technical Specification Group Radio Access Network; NR; Physical layer procedures for control (Release 16)"; Mar. 2020 (156 pages).
Zte; "TP for Timing Delta MAC CE"; 3GPP TSG-RAN WG2 Meeting #108, R2-1916538; Reno, Nevada, USA; Nov. 18-22, 2019 (4 pages).
Office Action issued in counterpart Japanese Patent Application No. 2022-513821 mailed on Oct. 22, 2024 (6 pages).
Huawei, HiSilicon; "Remaining issue for the Timing Delta MAC CE"; 3GPP TSG-RAN WG2 Meeting #109 electronic, R2-2000527; Feb. 24-Mar. 6, 2020 (3 pages).

(Continued)

*Primary Examiner* — Sam Bhattacharya
(74) *Attorney, Agent, or Firm* — Osha Bergman Watanabe & Burton LLP

(57) ABSTRACT

A radio communication node (100B) includes a cell information acquiring unit (165) that acquires a subcarrier interval to be set and a frequency range to be used; and a control unit (170) that sets a reference additional time included in a time difference from transmission in a serving cell to reception in the radio communication node and the granularity applied to the reference additional time based on the subcarrier interval and the frequency range.

4 Claims, 5 Drawing Sheets

(56) References Cited

PUBLICATIONS

3GPP TSG-RAN WG2 Meeting #109-e; R2-2002405 "Introduction of Integrated Access and Backhaul for NR" Samsung; E-meeting, Feb. 2020 (18 pages).
3GPP TSG-RAN WG2 Meeting #109 electronic; R2-2000508 "draft LS on signalling to support IAB timing synchronization" ZTE; Elbonia; Feb. 24-Mar. 6, 2020 (1 page).
3GPP TSG-RAN WG4 Meeting #92; R4-1909540 "Discussion on IAB OTA synchronization and RRM requirements" ZTE; Ljubljana, Slovenia; Aug. 26-30, 2019 (6 pages).
3GPP TSG RAN WG1 Meeting #100-e; R1-2000806 "FL summary on remaining issues in IAB case-1 timing" ZTE, Sanechips; e-Meeting; Feb. 24-Mar. 6, 2019 (7 pages).
3GPP TS 38.213 V16.0.0 "3rd Generation Partnership Project; Technical Specification Group Radio Access Network; NR; Physical layer procedures for control (Release 16)" Dec. 2019 (146 pages).
3GPP TS 23.501 V16.3.0 "3rd Generation Partnership Project; Technical Specification Group Services and System Aspects; System architecture for the 5G System (5GS); Stage 2 (Release 16)" Dec. 2019 (417 pages).
International Search Report issued in International Application No. PCT/JP2020/016043, mailed Nov. 10, 2020 (4 pages).
Written Opinion issued in International Application No. PCT/JP2020/016043; Dated Nov. 10, 2020 (3 pages).
Office Action issued in Chinese Application No. 202080099488.1, mailed Jan. 24, 2025 (7 pages).
Office Action issued in Japanese Application No. 2022-513821, mailed Mar. 11, 2025 (6 pages).

RADIO COMMUNICATION NODE

TECHNICAL FIELD

The present invention relates to a radio communication node that sets up radio access and radio backhaul.

BACKGROUND ART

The 3rd Generation Partnership Project (3GPP) has specified Long Term Evolution (LTE), and for the purpose of further increasing the speed of the LTE, specification of LTE-Advanced (hereinafter referred to as LTE including LTE-Advanced), and furthermore, 5th generation mobile communication system (5G, New Radio (NR) or Next Generation (NG) is also being advanced.

For example, in 3GPP Release-16, in the radio access network (RAN) of the NR, it is defined to support the Integrated Access and Backhaul (IAB) in which radio access to a terminal (User Equipment, UE) and a radio backhaul between radio communication nodes such as radio base stations (gNB) are integrated (see Non Patent Literature 1).

In the IAB, an IAB node has a Mobile Termination (MT), which is a function for connecting to a parent node (may also be referred to as an IAB donor), and a Distributed Unit (DU), which is a function for connecting to a child node or UE.

Furthermore, in 3GPP Release-16, an additional time ($T_{delta}$) added as a time difference from the transmission in the DU of the parent node (may be referred to as a serving cell) to the reception in the MT of the IAB node, and the like are defined (see Non Patent Literature 2).

Furthermore, a control element (CE) of a medium access control layer (MAC) for notifying the index (0, 1, 2, . . . , 1199) of $T_{delta}$ has also been proposed (see Non Patent Literature 3).

CITATION LIST

Non Patent Literature

Non Patent Literature 1
  3GPP TS 23.501 V16.3.0, 3rd Generation Partnership Project; Technical Specification Group Services and System Aspects; System architecture for the 5G System (5GS); Stage 2 (Release 16), 3GPP, December 2019
Non Patent Literature 2
  3GPP TS 38.213 V16.0.0, 3rd Generation Partnership Project; Technical Specification Group Radio Access Network; NR; Physical layer procedures for control (Release 16), 3GPP, December 2019
Non Patent Literature 3
  "Introduction of Integrated Access and Backhaul for NR", R2-2002405, 3GPP TSG-RAN WG2 Meeting #109-e, 3GPP, February 2020

SUMMARY OF INVENTION

However, an appropriate value of $T_{delta}$ may change according to the subcarrier interval (SCS) set in the serving cell and the frequency range (FR) used in the serving cell.

Therefore, a radio communication node such as an IAB node may not always be able to assume an appropriate $T_{delta}$.

The following disclosure is thus contrived in view of such a situation, and aims to provide a radio communication node in which an additional time ($T_{delta}$) added as a time difference from the DU transmission of the parent node to the MT reception of the IAB node can always be set appropriately.

According to one aspect of the present disclosure, there is provided a radio communication node (radio communication node 100B) including an acquiring unit (cell information acquiring unit 165) that acquires a subcarrier interval to be set and a frequency range to be used; and a control unit (control unit 170) that sets a reference additional time included in a time difference from transmission in a serving cell to reception in the radio communication node and a granularity applied to the reference additional time based on the subcarrier interval and the frequency range.

According to one aspect of the present disclosure, there is provided a radio communication node (radio communication node 100B) including a receiving unit (radio receiving unit 162) that receives a control element indicating an index of an additional time included in a time difference from transmission in a serving cell to reception in the radio communication node; and a control unit (control unit 170) that sets number of bits expressing the index based on at least one of a subcarrier interval to be set and a frequency range.

According to one aspect of the present disclosure, there is provided a radio communication node (radio communication node 100B) including a receiving unit (radio receiving unit 162) that receives a control element including an index of an additional time included in a time difference from transmission in a serving cell to reception in the radio communication node; and a control unit (control unit 170) that sets number of bits of the index to be read based on at least one of a subcarrier interval to be set and a frequency range.

According to one aspect of the present disclosure, there is provided a radio communication node (radio communication node 100B) including a receiving unit (radio receiving unit 162) that receives a control element including an index of an additional time included in a time difference from transmission in a serving cell to reception in the radio communication node; and a control unit (control unit 170) that sets number of bits of the index to be read regardless of a subcarrier interval to be set and a frequency range.

DESCRIPTION OF EMBODIMENTS

Figure 1:
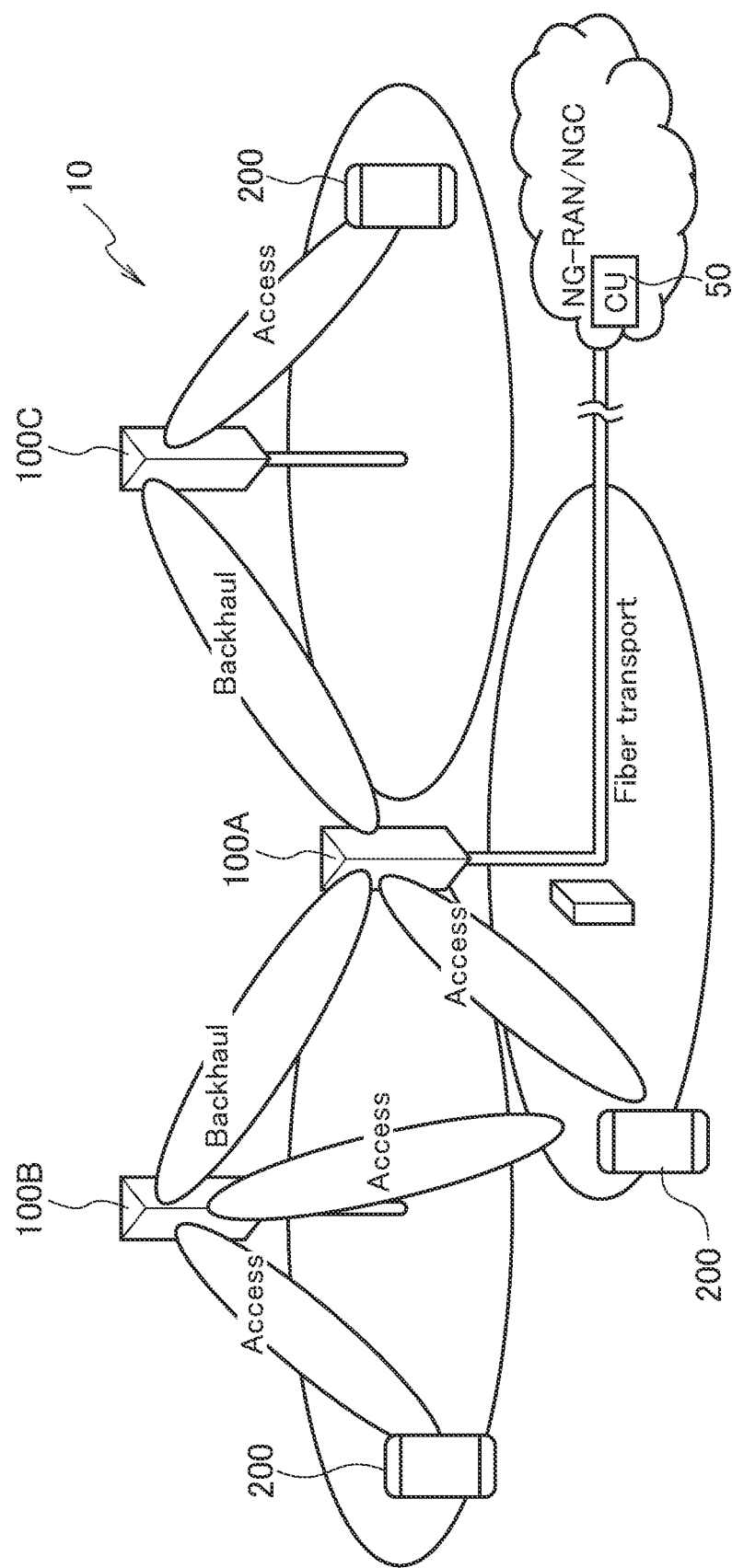
FIG. 1 is an overall schematic configuration view of a radio communication system 10.

An embodiment will be described below with reference to the drawings. The same functions and configurations are denoted with the same or similar reference numerals, and the description thereof will be appropriately omitted.

(1) Overall Schematic Configuration of Radio Communication System

FIG. 1 is an overall schematic configuration view of a radio communication system 10 according to the present embodiment. The radio communication system 10 is a radio communication system compliant with the 5G New Radio (NR), and includes a plurality of radio communication nodes and terminals.

Specifically, the radio communication system 10 includes radio communication nodes 100A, 100B, 100C and a terminal 200 (hereinafter referred to as UE 200, User Equipment).

The radio communication nodes 100A, 100B, 100C can set a radio access with the UE 200 and a radio backhaul (BH) between the radio communication nodes. Specifically, a backhaul (transmission path) by a radio link is set between the radio communication node 100A and the radio communication node 100B, and between the radio communication node 100A and the radio communication node 100C.

The configuration in which the radio access with the UE 200 and the radio backhaul between the radio communication nodes are integrated in such manner is called an Integrated Access and Backhaul (IAB).

The IAB reuses existing functions and interfaces defined for radio access. In particular, Mobile-Termination (MT), gNB-DU (Distributed Unit), gNB-CU (Central Unit), User Plane Function (UPF), Access and Mobility Management Function (AMF) and Session Management Function (SMF), as well as corresponding Interfaces such as NR Uu (MT to gNB/DU), F1, NG, X2 and N4 are used as the baseline.

The radio communication node 100A is connected to an NR radio access network (NG-RAN) and a core network (Next Generation Core (NGC) or 5GC) via a wired transmission path such as a fiber transport. The NG-RAN/NGC includes a Central Unit 50 (hereinafter referred to as CU50) that is a communication node. It should be noted that the NG-RAN and the NGC may be simply expressed as "network".

Note that the CU 50 may be configured by any of the above UPF, AMF, SMF or a combination thereof. Alternatively, the CU 50 may be a gNB-CU as described above.

Figure 2:
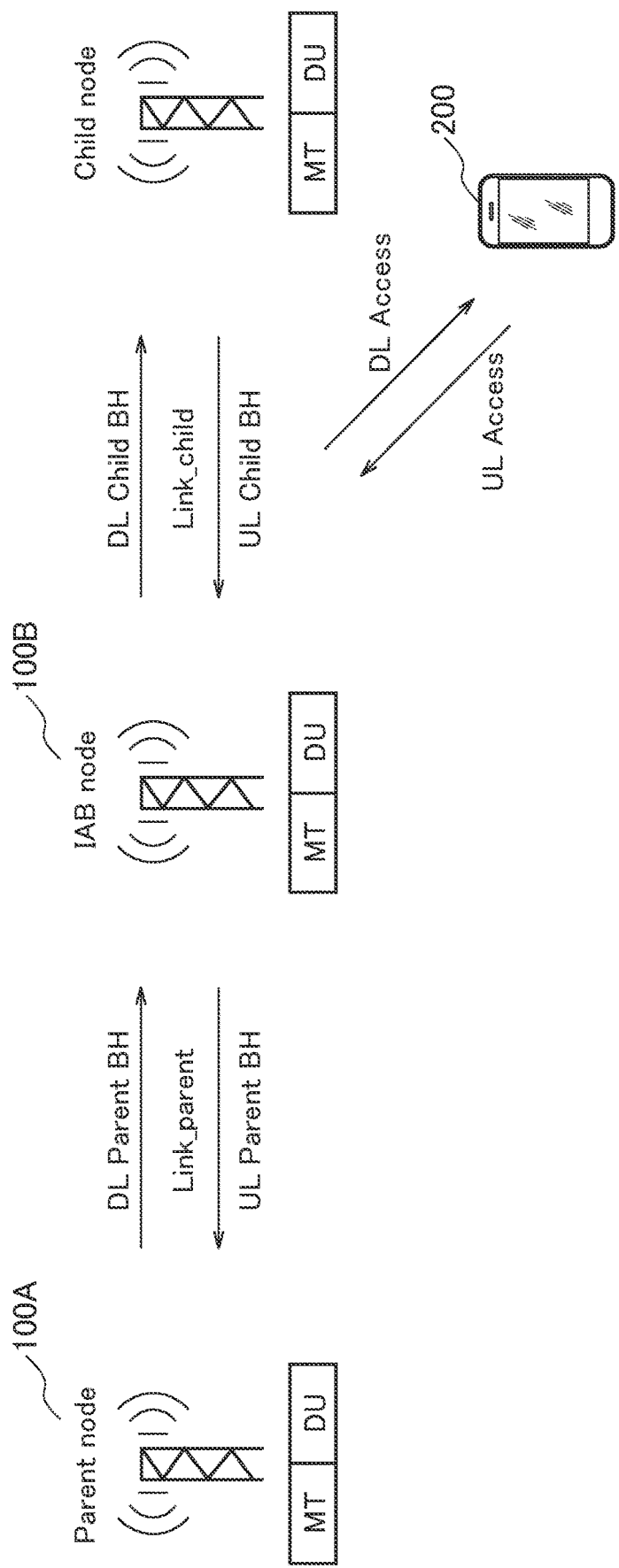
FIG. 2 is a view illustrating a basic configuration example of the IAB.

FIG. 2 is a view illustrating a basic configuration example of the IAB. As illustrated in FIG. 2, in the present embodiment, the radio communication node 100A forms a parent node (Parent node) in the IAB, and the radio communication node 100B (and the radio communication node 100C) forms an IAB node in the IAB. Note that the parent node may be referred to as an IAB donor or an upper node.

A child node (Child node) in the IAB is configured by another radio communication node not illustrated in FIG. 1. Alternatively, the UE 200 may configure a child node.

A radio link is set up between the parent node and the IAB node. Specifically, a radio link referred to as Link_parent is set.

A radio link is set up between the IAB node and the child node. Specifically, a radio link referred to as Link_child is set.

A radio link established between such radio communication nodes is referred to as a radio backhaul link. Link_parent is formed by a DL Parent BH in the downlink (DL) direction and a UL Parent BH in the uplink (UL) direction. Link_child is formed by a DL Child BH in the DL direction and a UL Child BH in the UL direction.

That is, in the IAB, the direction from the parent node to the child nodes (including UE 200) is the DL direction, and the direction from the child node to the parent node is the UL direction.

The radio link set between the UE 200 and the IAB node or the parent node is referred to as a radio access link. Specifically, the radio link is configured by a DL Access in the DL direction and a UL Access in the UL direction.

The IAB node has a Mobile Termination (MT), which is a function for connecting to a parent node, and a Distributed Unit (DU), which is a function for connecting to a child node (or UE 200). The child node may be referred to as a lower node.

Similarly, the parent node has an MT for connecting with an upper node and a DU for connecting with a lower node such as an IAB node. The parent node may have a CU (Central Unit) instead of the MT.

Furthermore, similarly to the IAB node and the parent node, the child node also has an MT for connecting with an upper node such as the IAB node and a DU for connecting with a lower node such as the UE 200.

Radio resources used by the DU are, in terms of DU, DL, UL, and Flexible time-resource (D/U/F), and the radio resources are classified into one of the types, Hard, Soft or Not Available (H/S/NA). Furthermore, available (available) or unavailable (not available) is also defined in the software (S).

Note that the IAB configuration example illustrated in FIG. 2 uses CU/DU division, but the IAB configuration is not necessarily limited to such a configuration. For example, in the radio backhaul, the IAB may be configured by tunneling using GPRS Tunneling Protocol (GTP)-U/User Datagram Protocol (UDP)/Internet Protocol (IP).

The main advantage of such an IAB is that NR cells can be arranged flexibly and at high density without densifying the transport network. The IAB can be applied to various scenarios such as arrangement of small cells outdoors, indoors, and even support for mobile relays (e.g., in buses and trains).

As illustrated in FIGS. 1 and 2, the IAB may also support NR-only standalone (SA) development, or non-standalone (NSA) development including other RATs (such as LTE).

In the present embodiment, the radio access and the radio backhaul operate on the premise of half-duplex communication (Half-duplex). However, it is not necessarily limited to half-duplex communication, and full-duplex communication (Full-duplex) may be used as long as the requirements are satisfied.

Furthermore, as the multiplexing scheme, time division multiplexing (TDM), space division multiplexing (SDM) and frequency division multiplexing (FDM) can be used.

When the IAB node operates in half-duplex communication (Half-duplex), the DL Parent BH is the receiving (RX) side and the UL Parent BH is the transmitting (TX) side, and the DL Child BH is the transmitting (TX) side and the UL Child BH is the receiving (RX) side. Moreover, in a case where Time Division Duplex (TDD) is adopted, the setting pattern of the DL/UL in the IAB node is not limited to only DL-F-UL, and the setting pattern such as UL-F-DL may be applied only for the radio backhaul (BH).

Furthermore, in 3GPP Release-16, in order to determine the DU transmission timing of the IAB node, (Formula 1) is defined as the time difference from the DU transmission of the parent node to the MT reception of the IAB node.

[Math 1]

$$(N_{TA}+N_{TA,offset}) \cdot T_c/2 + T_{delta} \quad \text{(Formula 1)}$$

Specifically, (Formula 1) is defined in Chapter 14 of 3GPP TS38.213 and Chapter 7.1.2 of TS38.133. $N_{TA}$ is originally a value of Timing Advance (TA) for determining the transmission timing of signals in the UL such as the UE 200. The $N_{TA}$ can take the values 0, 1, 2, . . . , 3846.

$N_{TA,\ offset}$ is defined in Chapter 7.1.2 of TS38.133 and is a value having $T_c$ as a unit. $N_{TA,\ offset}$ may differ depending on the frequency range (FR) and the communication scheme (TDD, Frequency Division Duplex (FDD)).

The radio communication system 10 corresponds to FR1 and FR2. The frequency bands of each FR are as follows.

FR1: 410 MHz to 7.125 GHz
FR2: 24.25 GHz to 52.6 GHz

In FR1, Sub-Carrier Spacing (SCS) of 15, 30 or 60 kHz is used, and a bandwidth (BW) of 5 to 100 MHz may be used. FR2 has a higher frequency than FR1, SCS of 60 or 120 kHz (240 kHz may be included) is used, and bandwidth (BW) of 50 to 400 MHz may be used. The radio communication system 10 may correspond to other FR such as a frequency band higher than FR2.

The radio communication node (including UE 200) can set $N_{TA, \text{ offset}}$ based on n-TimingAdvanceOffset which is a field included in the information element (IE) of the upper layer, specifically, the radio resource control layer (RRC).

$T_c$ is a basic time unit in the NR (5G) and is defined in Chapter 4.1 of 3GPP TS38.211. Specifically, (Formula 2) is defined.

[Math 2]

$$T_c = 1/(\Delta f_{max} \cdot N_f)$$ (Formula 2)

($\Delta f_{max}$ is 480·103 Hz. $N_f$ is 4096. Therefore, $T_c$ is 0.509 ns. $T_{delta}$ may be interpreted as an additional time added as a time difference defined by (Formula 1). $T_{delta}$ is also appropriately described as T_delta.

The time difference defined by (Formula 1) may be defined as the time difference between the DU transmission and the MT reception, as described above. $T_{delta}$ may be determined, for example, in consideration of the switching time from the reception to the transmission of the parent node, and may be a value of about half the switching time from the reception to the transmission in the parent node. In the present embodiment, the value of $T_{delta}$ is variable, as will be described later.

The IAB node can use the time difference defined by (Formula 1) to determine the transmission timing of the DU.

Furthermore, the TA can be transmitted by using the TA command in the Random Access Response (RAR) or the control element of the medium access control layer (MAC) (Medium Access Control-Control Element (MAC-CE), but in the present embodiment, MAC-CE that notifies $T_{delta}$ is further used.

Specifically, the MAC-CE including a field indicating the index (0, 1, 2, . . . , 1199) of $T_{delta}$ is used. The configuration of the MAC-CE will be further described later.

(2) Functional Block Configuration of Radio Communication System

Next, the functional block configuration of the radio communication node 100B that forms the radio communication system 10 will be described.

Figure 3:
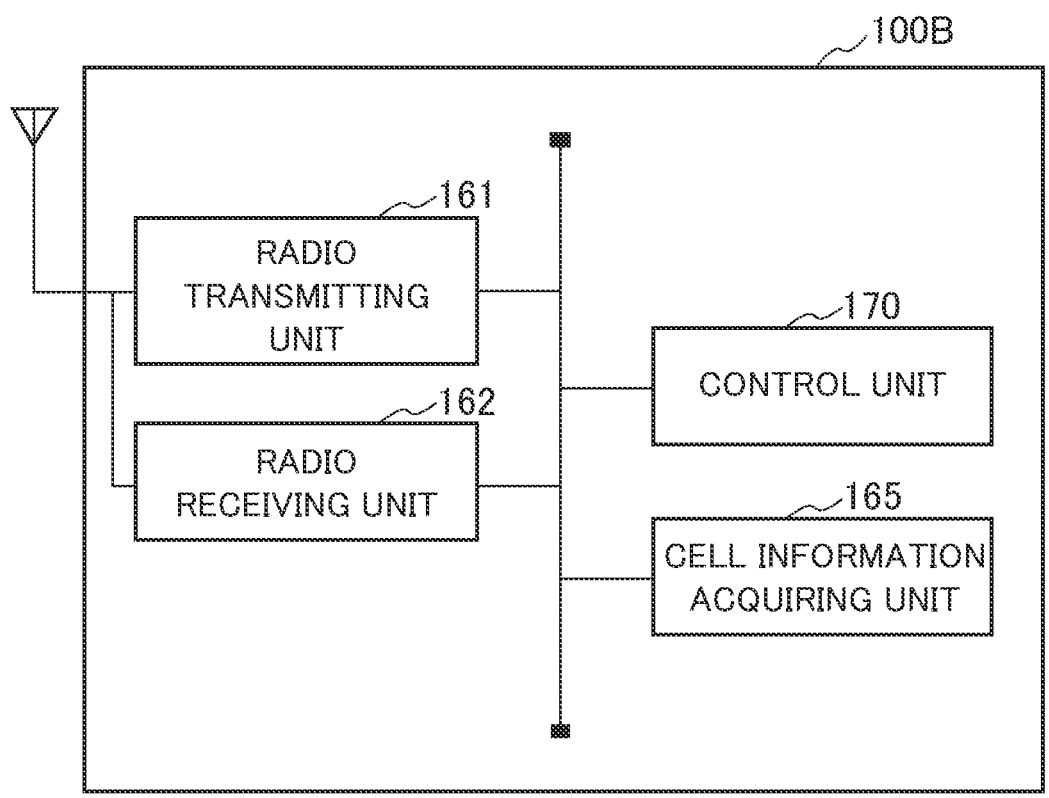
FIG. 3 is a functional block configuration view of a radio communication node 100B.

FIG. 3 is a functional block configuration view of the radio communication node 100B that forms an IAB node. As illustrated in FIG. 3, the radio communication node 100B includes a radio transmitting unit 161, a radio receiving unit 162, a cell information acquiring unit 165, and a control unit 170.

The radio transmitting unit 161 transmits a radio signal according to the 5G specifications. In addition, the radio receiving unit 162 transmits a radio signal according to the 5G specifications. In the present embodiment, the radio transmitting unit 161 and the radio receiving unit 162 execute radio communication with the radio communication node 100A that forms the parent node and the radio communication with the child node (including the case of the UE 200).

Furthermore, the radio receiving unit 162 can receive a control element indicating an index of the additional time included in the time difference from the transmission in the serving cell to the reception in the radio communication node 100B (LAB node). In the present embodiment, the radio receiving unit 162 forms a receiving unit.

Specifically, in order to derive the time difference from the DU transmission of the radio communication node 100A (parent node) forming the serving cell to the MT reception of the IAB node, the radio receiving unit 162 can receive the MAC-CE (may also be referred to as $T_{delta}$ MAC-CE) indicating the index of the $T_{delta}$ included in (Formula 1) described above.

As described above, the serving cell may be interpreted as a parent node (radio communication node) of the IAB or a gNB (radio base station). In addition, the serving cell may be simply interpreted as a cell to which the IAB node is connected, but more strictly, in a case of UE (radio communication node) of RRC_CONNECTED in which a carrier aggregation (CA) is not set, there is only one serving cell that configures the primary cell. In a case of UE (radio communication node) of RRC_CONNECTED configured using the CA, a serving cell may be interpreted as indicating a set of one or more cells including a primary cell and all secondary cells.

The cell information acquiring unit 165 acquires information regarding a cell formed by a parent node or the like. In the present embodiment, the cell information acquiring unit 165 configures an acquiring unit.

Specifically, the cell information acquiring unit 165 can acquire the subcarrier interval (SCS) set in the radio signal transmitted and received in the cell. Furthermore, the cell information acquiring unit 165 can acquire the frequency range (FR) used in the serving cell.

Note that the cell information acquiring unit 165 may, for example, receive the downlink control information (DCI) and acquire the SCS and the FR described above based on the received DCI. Information indicating the SCS and the FR (frequency band) may be interpreted as BWP: Bandwidth part. The DCI can be transmitted from the network to an IAB node or the like by PDCCH (Physical Downlink Control Channel).

The channel includes a control channel and a data channel. The control channel includes PDCCH (Physical Downlink Control Channel), PUCCH (Physical Uplink Control Channel), PRACH (Physical Random Access Channel), PBCH (Physical Broadcast Channel), and the like.

Furthermore, the data channel includes PDSCH (Physical Downlink Shared Channel), PUSCH (Physical Uplink Shared Channel), and the like.

The signal may include a channel and a reference signal. The reference signal includes a Demodulation Reference Signal (DMRS), a Sounding Reference Signal (SRS), a Phase Tracking Reference Signal (PTRS), a Channel State Information-Reference Signal (CSI-RS), and the like. Furthermore, the data may mean data transmitted via the data channel.

The control unit 170 executes control of each functional block forming the radio communication node 100B. Particularly, in the present embodiment, the control unit 170 executes control related to the above-mentioned time difference (time difference, see (Formula 1)).

Specifically, the control unit 170 can set a reference additional time (referred to as $T_{delta\_o}$) included in the time difference and a granularity applied to $T_{delta\_o}$. More specifically, the control unit 170 can set $T_{delta\_o}$ included in the time difference from the transmission in the serving cell to the reception in the radio communication node 100B and set the granularity applied to $T_{delta\_o}$ based on the SCS and the FR of the serving cell.

The control unit 170 may set a common value for at least one of $T_{delta\_o}$ or the granularity regardless of the SCS and the FR. That is, at least one of $T_{delta\_o}$ and the granularity may be fixed without changing depending on the SCS and the FR.

More specifically, only $T_{delta\_o}$ may be fixed, only the granularity may be fixed, or both $T_{delta\_o}$ and the granularity may be made common (fixed) regardless of the SCS and the FR.

Furthermore, the control unit 170 can set the number of bits expressing the index of $T_{delta}$ ($T_{delta}$ index) based on at least one of the SCS and the FR.

Specifically, the control unit 170 can set 11 bits or 12 bits as the number of bits expressing the $T_{delta}$ index in the $T_{delta}$ MAC-CE. Note that which of 11 bits and 12 bits should be set may be predefined by the network or may be based on a notification from the network. The notification from the network may be lower layer signaling such as DCI or upper layer signaling such as RRC.

Furthermore, the control unit 170 may also set the number of bits of the $T_{delta}$ index to be read based on at least one of the SCS and the FR.

For example, in the $T_{delta}$ MAC-CE, even when 11 bits are assigned as the number of bits expressing the $T_{delta}$ index, the number of bits of the $T_{delta}$ index to be read may be changed to 10 bits, 9 bits or the like based on at least one of the SCS and the FR. A setting example of the number of bits of the $T_{delta}$ index to be read will be described later.

Alternatively, the control unit 170 may set the number of bits of the $T_{delta}$ index to be read regardless of the SCS and the FR. That is, the control unit 170 may set the number of bits (reading range) of the $T_{delta}$ index to be read to be constant (fixed) regardless of the settings of the SCS and the FR. For example, the control unit 170 may fix the number of bits of the $T_{delta}$ index to be read to 11 bits.

(3) Operation of Radio Communication System

Next, the operation of the radio communication system 10 will be described. Specifically, an operation related to a setting of a time difference from the DU transmission of the parent node to the MT reception of the IAB node in the radio communication system 10 will be described.

(3.1) Assumption

First, the mapping of $T_{delta}$ and $T_{delta}$ index can be expressed as below.

$T_{delta\_value} = T_{delta\_o} + T_{delta}$ index*granularity, or $T_{delta\_value} = T_{delta\_o} - T_{delta}$ index*granularity Note that $T_{delta\_value}$ may mean a value (value of $T_{delta}$) used for calculation of the time difference of (Formula 1), as described above.

Note that $T_{delta\_o}$ (reference additional time) and the granularity may be defined in advance in the 3GPP specifications.

(3.2) Operation Overview

Hereinafter, an operation in which the IAB node sets an appropriate $T_{delta}$ depending on the SCS, the FR, and the like will be described.

(Operation example 1): Set $T_{delta\_o}$ and granularity.

(Alt. 1): Predefine $T_{delta\_o}$ and granularity for SCS, FR (e.g., FR1, FR2) or each of SCS and FR.

The IAB node sets the values of $T_{delta\_o}$ and the granularity depending on the SCS and the FR of the serving cell.

(Alt. 2): Predefine a value for each of SCS and FR for $T_{delta\_o}$, and predefine a common value for granularity regardless of the SCS and the FR.

The IAB node sets the value of $T_{delta\_o}$ depending on the SCS and the FR of the serving cell.

(Alt. 3): Predefine a value for each of SCS and FR for granularity, and predefine a common value for $T_{delta\_o}$ regardless of the SCS and the FR.

The IAB node sets the value of the granularity depending on the SCS and the FR of the serving cell.

(Alt. 4): Predefine a common value for $T_{delta\_o}$ and granularity regardless of the SCS and the FR.

In this case, $T_{delta\_o}$ and the granularity have unique values regardless of the SCS and the FR of the serving cell. Furthermore, in this case, 12 bits are required as the $T_{delta}$ index. Therefore, some of the reserved bits of the $T_{delta}$ MAC-CE are used.

(Operation example 2): Set number of bits (11/12 bits) of $T_{delta}$ index.

(Alt. 1): Change the number of bits for SCS, FR, or each of SCS and FR.

(Alt. 2): Set a certain number of bits regardless of the SCS and the FR.

In this case, the IAB node may set the reading range of the $T_{delta}$ index corresponding to the SCS and the FR.

(Alt. 3): The number of bits and the reading range of the $T_{delta}$ index by the IAB node are fixed regardless of the SCS and the FR.

(3.3) Operation Example 1

As described above, in the case of (Alt. 1), $T_{delta\_o}$ and granularity are predefined for SCS, FR, or each of SCS and FR. Here, $T_{delta\_o}$ may be an SCS unit, and granularity may be an FR unit, or an arbitrary combination.

The IAB node may apply $T_{delta\_o}$ and granularity according to the SCS, FR, or SCS and FR of the serving cell.

Table 1 illustrates a setting example of $T_{delta\_o}$ and granularity according to (Alt. 1).

TABLE 1

| FR | SCS [kHz] | Tdelta_o [Tc] | Granularity [Tc] |
|---|---|---|---|
| FR1 | 15 | $N_{TA,\ offset}/2 - 70528$ | 64 |
|  | 30 | $N_{TA,\ offset}/2 - 35328$ |  |
|  | 60 | $N_{TA,\ offset}/2 - 17664$ |  |
| FR2 | 60 | $N_{TA,\ offset}/2 - 17664$ | 32 |
|  | 120 | $N_{TA,\ offset}/2 - 8816$ |  |

In the case of Table 1, $T_{delta\_o}$ is based on the minimum value and $T_{delta\_value}$ may be calculated as below.

$T_{delta\_value} = T_{delta\_o} + T_{delta}$ index*granularity

Note that the numerical values ($T_{delta\_o}$ and granularity) in Table 1 are merely examples, and other values may be set.

Table 2 illustrates another setting example of $T_{delta\_o}$ and a granularity according to (Alt. 1).

TABLE 2

| FR | SCS [kHz] | Tdelta_o [Tc] | Granularity [Tc] |
|---|---|---|---|
| FR1 | 15 | $N_{TA,\,offset}/2 + 6256$ | 64 |
|  | 30 | $N_{TA,\,offset}/2 + 6128$ |  |
|  | 60 | $N_{TA,\,offset}/2 + 6032$ |  |
| FR2 | 60 | $N_{TA,\,offset}/2 + 6032$ | 32 |
|  | 120 | $N_{TA,\,offset}/2 + 6032$ |  |

In the case of Table 2, $T_{delta\_o}$ is based on the maximum value and $T_{delta\_value}$ may be calculated as below.

$$T_{delta\_value} = T_{delta\_o} - T_{delta}\text{ index} * \text{granularity}$$

The numerical values ($T_{delta\_o}$ and granularity) in Table 2 are merely examples, and other values may be set.

As described above, in the case of (Alt. 2), a value for each of SCS and FR is defined in advance for $T_{delta\_o}$, and a common value is defined in advance for the granularity regardless of the SCS and the FR. In this case, the IAB node sets the value of $T_{delta\_o}$ depending on the SCS, FR, or SCS and FR of the serving cell.

For example, the granularity may be defined in advance as $32*T_c$, as in the example of (Alt. 1). Other values may be set for $T_{delta\_o}$ and the granularity.

Moreover, as described above, in the case of (Alt. 3), a value for each of SCS and FR is defined in advance for granularity, and a common value is defined in advance for the $T_{delta\_o}$ regardless of the SCS and the FR. In this case, the IAB node sets the value of the granularity depending on the SCS, FR, or SCS and FR of the serving cell.

For example, as in the example of (Alt. 1), $T_{delta\_o}$ may be set as below.

$$T_{delta\_o} = N_{TA,\,offset}/2 - 70528,\ T_{delta\_value} = T_{delta\_o} - T_{delta}\text{ index} * \text{granularity, or}$$

$$T_{delta\_o} = N_{TA,\,offset}/2 + 6256,\ T_{delta\_value} = T_{delta\_o} - T_{delta}\text{ index} * \text{granularity}$$

Other values may be set for $T_{delta\_o}$ and the granularity.

Furthermore, as described above, in the case of (Alt. 4), a common value is defined in advance for $T_{delta\_o}$ and the granularity regardless of the SCS and the FR. In (Alt. 4), an integrated mapping of $T_{delta}$ index and $T_{delta\_value}$ of $T_{delta}$ MAC-CE targeting on all SCSs and FRs is made.

In a case of (Alt. 4), 12 bits are required to display all $T_{delta}$ indexes.

Figure 4A:
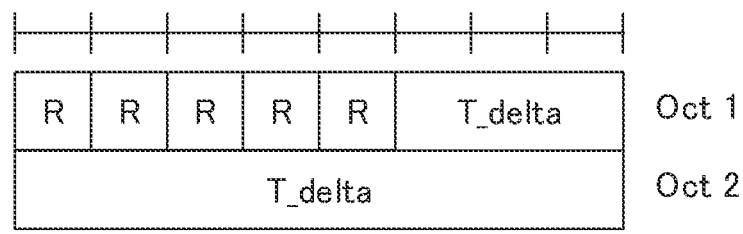
FIG. 4A is a view illustrating a configuration example (part 1) of $T_{delta}$ MAC-CE.
Figure 4B:
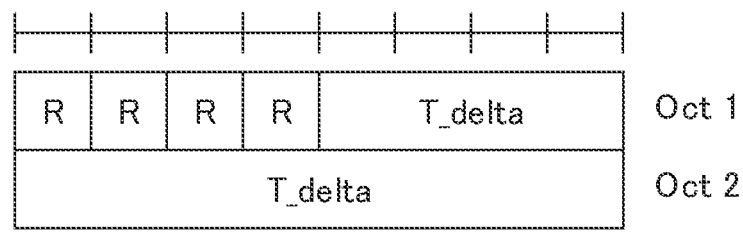
FIG. 4B is a view illustrating a configuration example (part 2) of $T_{delta}$ MAC-CE.

FIG. 4A illustrates a configuration example (part 1) of $T_{delta}$ MAC-CE, and FIG. 4B illustrates a configuration example (part 2) of $T_{delta}$ MAC-CE.

The configuration example (1) of $T_{delta}$ MAC-CE is similar to the configuration of $T_{delta}$ MAC-CE illustrated in Non Patent Literature 3 (R2-2002405). As illustrated in FIG. 4A, 3 bits of octet 1 (Oct 1) and 8 bits of octet 2 (Oct 2) (all bits), that is, a total of 11 bits are assigned for $T_{delta}$ index.

On the other hand, in FIG. 4B, since 12 bits are assigned, 1 bit of the reserved bit (R) of octet 1 is added.

In the case of (Alt. 4) as well, $T_{delta\_o}$ may be set as below, similarly to (Alt. 3).

$$T_{delta\_o} = N_{TA,\,offset}/2 - 70528,\ T_{delta\_value} = T_{delta\_o} - T_{delta}\text{ index} * \text{granularity, or}$$

$$T_{delta\_o} = N_{TA,\,offset}/2 + 6256,\ T_{delta\_value} = T_{delta\_o} - T_{delta}\text{ index} * \text{granularity}$$

Furthermore, similarly to (Alt. 2), the granularity may be defined in advance as $32*T_c$. Other values may be set for $T_{delta\_o}$ and the granularity.

(3.4) Operation Example 2

As described in operation example 1, the length (number of bits) of the bit field of $T_{delta}$ index of $T_{delta}$ MAC-CE (see FIGS. 4A and 4B) can be 11 bits and 12 bits, and furthermore, may be other values (e.g., 10 bits).

Here, the number of bits meaningful (that is, necessary) for the IAB node to determine the value of $T_{delta}$ index (may be read as $T_{delta\_value}$) and the range of $T_{delta}$ index that the IAB node assumes may vary depending on the SCS, FR, or SCS and FR of the serving cell.

Considering the number of bits meaningful for the IAB node to determine the value of $T_{delta}$ index and the allowable range of the $T_{delta}$ index, as described above, there are options (Alt. 1) to (Alt. 3).

In the case of (Alt. 1), the meaningful number of bits of the $T_{delta}$ index may vary for SCS, FR, or each of SCS and FR. The allowable range of the $T_{delta}$ index may also vary for SCS, FR, or each of SCS and FR. Note that the number of bits and the allowable range, and the SCS and the FR may be combined in any way, for example, the number of bits may differ for each SCS and the allowable range may differ for each FR.

In the case of (Alt. 1), the IAB node determines the meaningful number of bits of the $T_{delta}$ index according to the SCS, FR, or SCS and FR of the serving cell.

Table 3 illustrates a setting example of the meaningful number of bits of the $T_{delta}$ index and the allowable range of the $T_{delta}$ index according to (Alt. 1).

TABLE 3

| FR | SCS [kHz] | number of meaningful Tdelta_index bit | Range of Tdelta_index |
|---|---|---|---|
| FR1 | 15 | 11-bit | (0, 1199) |
|  | 30 | 10-bit | (0, 674) |
|  | 60 | 9-bit | (0, 370) |
| FR2 | 60 | 10-bit | (0, 740) |
|  | 120 | 9-bit | (0, 464) |

For example, when the FR1 is used and the SCS is 15 kHz, the IAB node sets the meaningful number of bits of the $T_{delta}$ index to 11 bits. That is, the IAB node decides the $T_{delta}$ index based on the content of 11 bits from the highest or the lowest of $T_{delta}$ MAC-CE.

Furthermore, for example, when the FR1 is used and the SCS is 30 kHz, the IAB node sets the meaningful number of bits of the $T_{delta}$ index to 10 bits. That is, the IAB node decides the $T_{delta}$ index based on the content of 10 bits from the highest or the lowest of $T_{delta}$ MAC-CE.

In this case, the IAB node may ignore the remaining other bits, expect other bits set to a default value (e.g. 0 or 1), or expect to be used for other purposes.

Furthermore, the allowable range of the $T_{delta}$ index assumed by the IAB node may vary for the SCS, FR, or each of SCS and FR. For example, when the FR1 is used and the SCS is 15 kHz, the IAB node may assume (0, 1199), that is, the $T_{delta}$ index of 0 to 1199.

For example, when the FR1 is used and the SCS is 30 kHz, the IAB node may assume (0, 674), that is, the $T_{delta}$ index of 0 to 674.

Note that the numerical values illustrated in Table 3 are examples, and other values may be set. Furthermore, the meaningful number of bits of the $T_{delta}$ index and the allowable range of the $T_{delta}$ index may depend on the $T_{delta\_o}$ and the granularity described in operation example 1. That is, the example of the number of bits and the allowable range described above may be based on the assumption of (Alt. 1) of operation example 1.

In the case of (Alt. 2), the meaningful number of bits of the $T_{delta}$ index is constant for all SCSs and FRs. The allowable range of the $T_{delta}$ index may be set for SCS, FR, or each of SCS and FR.

Table 4 illustrates a setting example of the meaningful number of bits of the $T_{delta}$ index and the allowable range of the $T_{delta}$ index according to (Alt. 2).

TABLE 4

| FR | SCS [kHz] | Number of meaningful Tdelta_index bit | Range of Tdelta_index |
|---|---|---|---|
| FR1 | 15 | 11-bit | (0, 1199) |
|  | 30 | 11-bit | (0, 674) |
|  | 60 | 11-bit | (0, 370) |
| FR2 | 60 | 11-bit | (0, 740) |
|  | 120 | 11-bit | (0, 464) |

As illustrated in Table 4, the meaningful number of bits of the $T_{delta}$ index is fixed regardless of the SCS and the FR and is 11 bits. This is the same length as the bit field of the $T_{delta}$ index of the $T_{delta}$ MAC-CE.

On the other hand, as illustrated in Table 4. The allowable range of the $T_{delta}$ index assumed by the IAB node may vary for the SCS, FR, or each of SCS and FR. For example, when the FR1 is used and the SCS is 15 kHz, the IAB node may assume (0, 1199), that is, the $T_{delta}$ index of 0 to 1199.

For example, when the FR1 is used and the SCS is 30 kHz, the IAB node may assume (0, 674), that is, the $T_{delta}$ index of 0 to 674.

Note that the numerical values illustrated in Table 4 are also examples, and other values may be set. Furthermore, the meaningful number of bits of the $T_{delta}$ index and the allowable range of the $T_{delta}$ index may depend on the $T_{delta\_o}$ and the granularity described in operation example 1. That is, the example of the number of bits and the allowable range described above may be based on the assumption of (Alt. 1) of operation example 1.

In the case of (Alt. 3), the meaningful number of bits of the $T_{delta}$ index is constant for all SCSs and FRs. The allowable range of the $T_{delta}$ index is also constant for all SCSs and FRs.

In the case of (Alt. 3), the meaningful number of bits of the $T_{delta}$ index is fixed regardless of the SCS and the FR, and may be, for example, 11 bits. Furthermore, the allowable range of the $T_{delta}$ index is fixed regardless of the SCS and the FR, and for example, the IAB node may assume (0, 1199), that is, $T_{delta}$ index of 0 to 1199.

In the case of (Alt. 3) as well, such numerical values are also examples, and other values may be set. Furthermore, the meaningful number of bits of the $T_{delta}$ index and the allowable range of the $T_{delta}$ index may depend on the $T_{delta\_o}$ and the granularity described in operation example 1. That is, the example of the number of bits and the allowable range described above may be based on the assumption of operation example 1.

(4) Operation/Effect

According to the embodiment described above, the following operations and effects are obtained. Specifically, the radio communication node 100B (LAB node) can set $T_{delta\_o}$ included in the time difference from the transmission in the serving cell to the reception in the radio communication node 100B and set the granularity applied to $T_{delta\_o}$ based on the SCS and the FR of the serving cell.

Therefore, even when the appropriate $T_{delta}$ value ($T_{delta\_value}$) varies depending on the SCS and the FR of the serving cell, the radio communication node 100B can assume an appropriate $T_{delta}$. Thus, the radio communication node 100B can always set $T_{delta}$ appropriately, and can contribute to more efficient utilization of radio resources and improvement of communication quality in the radio communication system 10 as a whole.

In the present embodiment, the radio communication node 100B can set a common value for at least one of $T_{delta\_o}$ or the granularity regardless of the SCS and the FR. Therefore, if $T_{delta\_o}$ or the granularity is not significantly affected by the values of the SCS and the FR, the processing load on the radio communication node 100B can be reduced by setting a common value.

In the present embodiment, the radio communication node 100B can set the number of bits expressing the $T_{delta}$ index based on at least one of the SCS and the FR of the serving cell. Furthermore, in the present embodiment, the radio communication node 100B can also set the number of bits of the $T_{delta}$ index to be read based on at least one of the SCS and the FR.

Therefore, even when the appropriate $T_{delta}$ value ($T_{delta\_value}$) varies depending on the SCS and the FR of the serving cell, the radio communication node 100B can assume an appropriate $T_{delta}$. Thus, the radio communication node 100B can always set $T_{delta}$ appropriately, and can contribute to more efficient utilization of radio resources and improvement of communication quality in the radio communication system 10 as a whole.

Moreover, the radio communication node 100B can set the number of bits of the $T_{delta}$ index to be read regardless of the SCS and the FR of the serving cell. That is, the radio communication node 100B can make the number of bits of the $T_{delta}$ index to be read constant (fixed) regardless of the SCS and the FR of the serving cell.

Therefore, if the number of bits of the $T_{delta}$ index is not significantly affected by the values of the SCS and the FR, the processing load on the radio communication node 100B can be reduced by setting a common value.

(5) Other Embodiments

Although the embodiment has been described above, it is obvious to those skilled in the art that the present invention is not limited to the description of the embodiment and various modifications and improvements can be made.

For example, in the embodiment described above, names such as parent node, IAB node, and child node were used, but the names may be differed only when the configuration of the radio communication node in which the radio backhaul between radio communication nodes such as gNB and the radio access with the terminal are integrated is adopted. For example, it may be simply referred to as a first node, a second node, and the like, or may be referred to as an upper node, a lower node or a relay node, an intermediate node, and the like.

Furthermore, the radio communication node may be simply referred to as a communication device or a communication node, or may be read as a radio base station.

Furthermore, in the embodiment described above, $T_{delta}$ is expressed as the additional time and $T_{delta\_o}$ is expressed as the reference additional time, but the term of the additional time may be read as other terms, for example, a predetermined time or a minute time. Furthermore, the term "granularity" may be read as other terms such as roughness, grade, and level.

In the embodiment described above, the terms downlink (DL) and uplink (UL) are used, but they may be called in other terms. For example, the terms may be replaced or associated with terms such as forward ring, reverse link, access link, and backhaul. Alternatively, terms such as a first link, a second link, a first direction, ae second direction, etc. may be simply used.

Moreover, the block configuration view used for explaining the embodiments described above (FIG. 3) illustrates blocks of functional unit. Those functional blocks (structural components) can be realized by an arbitrary combination of at least one of hardware and software. The method for realizing each functional block is not particularly limited. That is, each functional block may be realized by one device combined physically or logically, or two or more devices separated physically or logically may be directly or indirectly connected (e.g., wired, or wireless) to each other and such plural devices may be used to realize each functional block. The functional blocks may be realized by combining software with the one device or the plural devices mentioned above.

Functions include judging, determining, deciding, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like, but are not limited thereto. For example, a functional block (structural component) that causes transmission may be referred to as a transmitting unit or a transmitter. For any of the above, as explained above, the method for realizing is not particularly limited to any one method.

Figure 5:
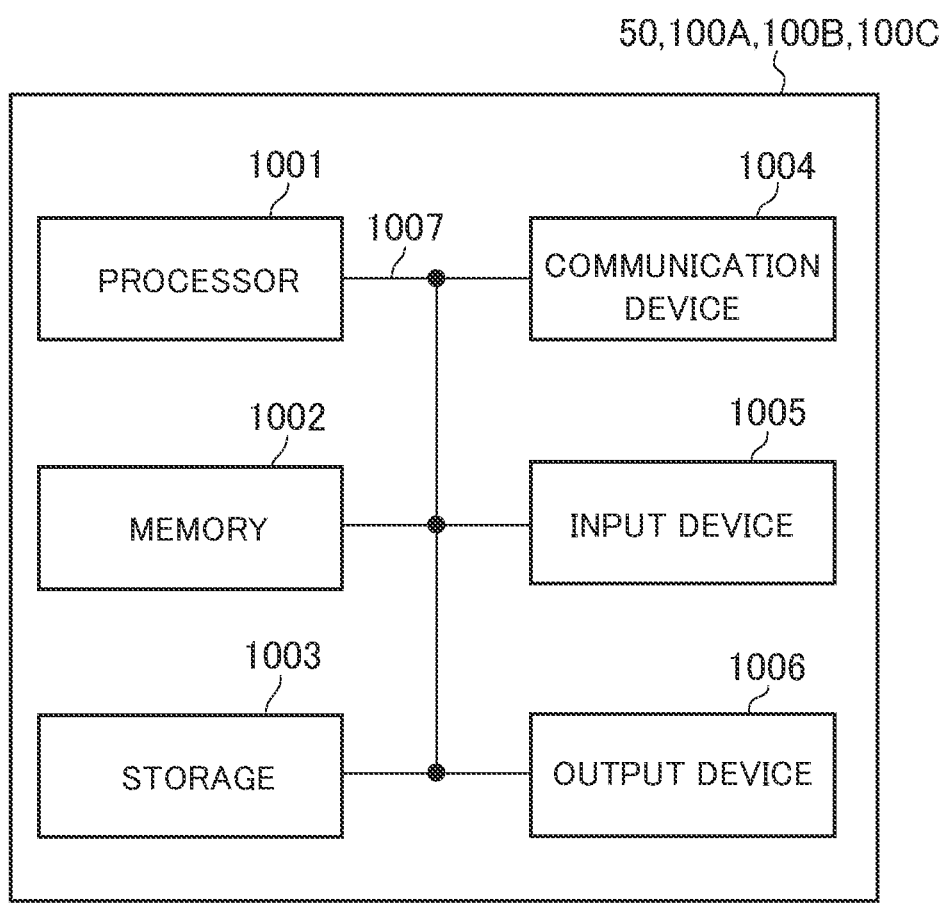
FIG. 5 is a view illustrating an example of a hardware configuration of a CU 50 and radio communication nodes 100A to 100C.

Furthermore, the CU 50 and the radio communication nodes 100A to 100C (devices) described above may function as a computer that performs the process of the radio communication method of the present disclosure. FIG. 5 is a view illustrating an example of a hardware configuration of the device. As illustrated in FIG. 5, the device may be configured as a computer device including a processor 1001, a memory 1002, a storage 1003, a communication device 1004, an input device 1005, an output device 1006, a bus 1007, and the like.

Furthermore, in the following explanation, the term "device" can be read as a circuit, device, unit, and the like. The hardware configuration of the device may be configured by including one or a plurality of the devices illustrated in the figure, or may be configured by without including some of the devices.

Each functional block (see FIG. 3) of the radio communication node 100B can be realized by any of the hardware elements of the computer device or a combination of the hardware elements.

Moreover, the processor 1001 performs computing by loading a predetermined software (computer) on hardware such as the processor 1001 and the memory 1002, and various functions of the device are realized by controlling communication via the communication device 1004 and controlling at least one of read or write of data on the memory 1002 and the storage 1003.

The processor 1001, for example, operates an operating system to control the entire computer. The processor 1001 may be configured with a central processing unit (CPU) including an interface with a peripheral device, a control device, a computing device, a register, and the like.

Moreover, the processor 1001 reads a program (program code), a software module, data, and the like from at least one of the storage 1003 and the communication device 1004 into the memory 1002, and executes various processes according to the data. As the program, a program that causes a computer to execute at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. The memory 1002 can be referred to as register, cache, main memory (main storage device), and the like. The memory 1002 can save therein a program (program codes), software modules, and the like that can execute the method according to one embodiment of the present disclosure.

The storage 1003 is a computer readable recording medium and is configured, for example, with at least one of an optical disk such as Compact Disc ROM (CD-ROM), a hard disk drive, a flexible disk, a magneto-optical disk (e.g., a compact disk, a digital versatile disk, Blu-ray (Registered Trademark) disk), a smart card, a flash memory (e.g., a card, a stick, a key drive), a floppy (Registered Trademark) disk, a magnetic strip, and the like. The storage 1003 can be referred to as an auxiliary storage device. The recording medium described above can be, for example, a database including at least one of the memory 1002 and the storage 1003, a server, or other appropriate medium.

The communication device 1004 is hardware (transmitting/receiving device) for performing communication between computers through at least one of a wired network or a wireless network, and is also referred to as, for example, a network device, a network controller, a network card, a communication module, and the like.

The communication device 1004 may be configured to include a high-frequency switch, a duplexer, a filter, a frequency synthesizer, and the like in order to realize, for example, at least one of Frequency Division Duplex (FDD) and Time Division Duplex (TDD).

The input device 1005 is an input device (e.g., a keyboard, a mouse, a microphone, a switch, a button, a sensor, and the like) that accepts input from the outside. The output device 1006 is an output device (e.g., a display, a speaker, an LED lamp, and the like) that outputs data to the outside. Note that, the input device 1005 and the output device 1006 may be integrated (e.g., a touch screen).

In addition, the respective devices, such as the processor 1001 and the memory 1002, are connected to each other with the bus 1007 for communicating information. The bus 1007 may be formed using a single bus or may be formed using different buses between the devices.

Furthermore, the device may be configured to include hardware such as a microprocessor, a digital signal processor (Digital Signal Processor: DSP), Application Specific Integrated Circuit (ASIC), Programmable Logic Device (PLD), and Field Programmable Gate Array (FPGA), and some or all of these functional blocks may be realized by the hardware. For example, the processor 1001 may be implemented using at least one of these hardware.

Notification of information is not limited to the aspect/embodiment described in the present disclosure, and may be performed using a different method. For example, the notification of information may be performed by physical layer signaling (e.g., Downlink Control Information (DCI), Uplink Control Information (UCI), upper layer signaling (e.g., RRC signaling, Medium Access Control (MAC) signaling, broadcasting information (Master Information Block (MIB), System Information Block (SIB)), other signals, or a combination thereof. The RRC signaling may be referred to as RRC message, for example, and may be RRC Connection Setup message, RRC Connection Reconfiguration message, or the like.

Each aspect/embodiment described in the present disclosure may be applied to at least one of Long Term Evolution (LTE), LTE-Advanced (LTE-A), SUPER 3G, IMT-Advanced, 4th generation mobile communication system (4G), $5^{th}$ generation mobile communication system (5G), Future Radio Access (FRA), New Radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), a system using any other appropriate system, and a next-generation system expanded based on the above. Furthermore, a plurality of systems may be combined (e.g., a combination of at least one of the LTE and the LTE-A and the 5G).

As long as there is no inconsistency in the processing procedure, sequence, flowchart, and the like of each aspect/embodiment described in the present disclosure, the order may be interchanged. For example, elements of various steps have been mentioned using an exemplary order in the method described in the present disclosure, but they are not limited to the specific order mentioned above.

The specific operation assumed to be performed by the base station in the present disclosure may be performed by its upper node in some cases. In a network including one or more network nodes having a base station, it is apparent that the various operations performed for communication with the terminal may be performed by at least one of the base station and another network node other than the base station (e.g., MME, S-GW, etc. may be considered, but not limited thereto). A case where there is one network node other than the base station has been described above, but a combination of a plurality of other network nodes (e.g., MME and S-GW) may be adopted.

Information and signals (information etc.) can be output from the upper layer (or lower layer) to the lower layer (or upper layer). The information and the like may be input and output via a plurality of network nodes.

The input/output information can be saved in a specific location (e.g., a memory) or can be managed using a management table. The information to be input/output can be overwritten, updated, or added. The output information can be deleted. The input information can be transmitted to another device.

The decision may be made by a value (0 or 1) represented by one bit or by a truth value (Boolean: true or false), or may be made by comparison of numerical values (e.g., comparison with a predetermined value).

Each aspect/embodiment described in the present disclosure may be used alone or in combination, or may be switched in accordance with the execution. Furthermore, notification of predetermined information (e.g., notification of "being X") is not limited to being performed explicitly, and may be performed implicitly (e.g., without notifying the predetermined information).

Regardless of whether being referred to as software, firmware, middleware, microcode, hardware description language, or some other names, software should be interpreted broadly to mean instruction, instruction set, code, code segment, program code, program, subprogram, software module, application, software application, software package, routine, subroutine, object, executable file, execution thread, procedure, function, and the like.

Furthermore, software, instruction, information, and the like may be transmitted and received via a transmission medium. For example, when software is transmitted from a website, a server, or some other remote source using at least one of a wired technology (coaxial cable, optical fiber cable, twisted pair, Digital Subscriber Line (DSL), or the like) and a wireless technology (infrared light, microwave, or the like), at least one of these wired and wireless technologies is included within the definition of the transmission medium.

Information, signals, or the like described in the present disclosure may be represented using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or an arbitrary combination thereof.

It should be noted that the terms described in the present disclosure and the terms necessary for understanding the present disclosure may be replaced with terms having the same or similar meanings. For example, at least one of a channel and a symbol may be a signal (signaling). Furthermore, a signal may be a message. Moreover, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure may be represented by an absolute value, may be represented using a relative value from a predetermined value, or may be represented using other corresponding information. For example, the radio resource can be indicated by an index.

The name used for the above parameter should not be restrictive in any respect. In addition, formulas and the like that use these parameters may be different from those explicitly disclosed in the present disclosure. As the various channels (e.g., PUCCH, PDCCH, etc.) and information element can be identified by any suitable name, the various names assigned to these various channels and information elements should not be restrictive in any aspect.

In the present disclosure, terms such as "base Station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (e.g., three) cells (also referred to as sectors). In a case where the base station accommodates a plurality of cells, the entire coverage area of the base station can be divided into a plurality of smaller areas, and each of such smaller areas can provide a communication service by a base station subsystem (e.g., a small base station for indoor use (Remote Radio Head: RRH)).

The term "cell" or "sector" refers to a part of or all of the coverage area of at least one of a base station and a base station subsystem that performs a communication service in the relevant coverage.

In the present disclosure, the terms "mobile station (MS)", "user terminal", "user equipment (UE)", "terminal" and the like can be used interchangeably.

The mobile station is sometimes called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or some other suitable terms.

At least one of the base station and the mobile station may be referred to as a transmitting device, a receiving device, a communication device, or the like. Note that, at least one of the base station and the mobile station may be a device mounted on a moving body, a moving body itself, or the like. The moving body may be a vehicle (e.g., a car, an airplane, etc.), a moving body that moves unmanned (e.g., a drone, an automatically driven vehicle, etc.), or a robot (manned type or unmanned type). At least one of the base station and the mobile station also includes a device that does not necessarily move at the time of the communication operation. For example, at least one of the base station and the mobile station may be an Internet of Things (IoT) device such as a sensor.

Furthermore, a base station in the present disclosure may be read as a mobile station (user terminal, hereinafter the same). For example, the configuration in which the communication between the base station and the mobile station is replaced by a communication between a plurality of mobile stations (e.g., may be referred to as Device-to-Device (D2D), Vehicle-to-Everything (V2X), etc.) may be applied with each aspects/embodiment of the present disclosure. In this case, the mobile station may have the function of the base station. Words such as "uplink" and "downlink" may also be read with words corresponding to inter-terminal communication (e.g., "side"). For example, an uplink channel, a downlink channel, or the like may be read as a side channel.

Similarly, the mobile station in the present disclosure may be read as a base station. In this case, the base station may have the function of the mobile station.

A radio frame may be formed by one or more frames in the time domain. Each frame or frames in the time domain may be referred to as a subframe.

A subframe may also be formed by one or more slots in the time domain. The subframe may have a fixed time length (e.g., 1 ms) that does not depend on numerology.

The numerology may be a communication parameter applied to at least one of transmission and reception of a certain signal or channel. Numerology may indicate at least one of, for example, subcarrier spacing (SCS), bandwidth, symbol length, cyclic prefix length, transmission time interval (TTI), number of symbols per TTI, radio frame configuration, specific filtering process performed by a transmitter/receiver in a frequency domain, specific windowing process performed by a transmitter/receiver in the time domain, and the like.

A slot may be configured by one or more symbols (Orthogonal Frequency Division Multiplexing (OFDM) symbols, Single Carrier Frequency Division Multiple Access (SC-FDMA) symbols, etc.) in the time domain. A slot may be a time unit based on numerology.

The slot may include a plurality of minislots. Each minislot may be formed by one or more symbols in the time domain. The minislot may also be referred to as a subslot. A minislot may be formed by fewer number of symbols than the slot. The PDSCH (or PUSCH) transmitted in a time unit larger than a minislot may be referred to as PDSCH (or PUSCH) mapping type A. The PDSCH (or PUSCH) transmitted using the minislot may be referred to as PDSCH (or PUSCH) mapping type B.

The radio frame, subframe, slot, minislot, and symbol all represent a time unit for transmitting a signal. The radio frame, subframe, slot, minislot, and symbol may have different names corresponding to thereto.

For example, one subframe may be referred to as a transmission time interval (TTI), a plurality of consecutive subframes may be referred to as TTI, and one slot or one minislot may be referred to as TTI. That is, at least one of the subframe and the TTI may be a subframe in the existing LTE (1 ms), a period shorter than 1 ms (e.g., 1 to 13 symbols), or a period longer than 1 ms. The unit representing TTI may be referred to as a slot, a minislot, and the like instead of a subframe.

Here, TTI refers to, for example, the minimum time unit of scheduling in the radio communication. For example, in the LTE system, the base station performs scheduling to allocate the radio resource (frequency bandwidth, transmission power etc. that can be used in each user terminal) in units of TTI to each user terminal. The definition of TTI is not limited thereto.

The TTI may be a transmission time unit of a channel-encoded data packet (transport block), a code block, a codeword, or the like, or a processing unit such as scheduling, link adaptation, or the like. When a TTI is given, the time interval (e.g., the number of symbols) in which the transport block, code block, codeword, and the like are actually mapped may be shorter than the TTI.

When one slot or one minislot is referred to as TTI, one or more TTIs (i.e., one or more slots or one or more minislots) may be the minimum time unit of scheduling. Furthermore, the number of slots (the number of minislots) forming the minimum time unit of the scheduling may be controlled.

The TTI having a time length of 1 ms may be referred to as usual TTI (TTI in LTE Rel. 8-12), normal TTI, long TTI, usual subframe, normal subframe, long subframe, slot, and the like. The TTI shorter than the usual TTI may be referred to as shortened TTI, short TTI, partial TTI (partial or fractional TTI), shortened subframe, short subframe, minislot, subslot, slot, and the like.

Note that the long TTI (e.g., usual TTI, subframe, etc.) may be read as a TTI having a time length of more than 1 ms, and the short TTI (e.g., shortened TTI) may be read as a TTI having a TTI length of less than the TTI length of the long TTI and greater than or equal to 1 ms.

The resource block (RB) is a resource allocation unit in the time domain and the frequency domain, and may include one or more continuous subcarriers in the frequency domain. The number of subcarriers included in the RB may be the same regardless of the numerology, and may be, for example, 12. The number of subcarriers included in the RB may be determined based on numerology.

Furthermore, the time domain of the RB may include one or more symbols, and may be have a length of one slot, one minislot, one subframe, or one TTI. One TTI, one subframe, and the like may be configured by one or more resource blocks.

Note that one or more RBs may be referred to as physical resource blocks (Physical RB: PRB), subcarrier groups (Sub-Carrier Group: SCG), resource element groups (Resource Element Group: REG), PRB pairs, RB pairs, and the like.

Furthermore, the resource block may be configured by one or more resource elements (Resource Element: RE). For example, one RE may be a radio resource region of one subcarrier and one symbol.

A bandwidth Part (BWP) (may also be referred to as partial bandwidth) may represent a subset of consecutive common RB (common resource blocks) for a certain neurology in a certain carrier. Here, the common RB may be specified by the index of the RB based on the common reference point of the carrier. The PRB may be defined in a BWP and numbered within that BWP.

The BWP may include a BWP for UL (UL BWP) and a BWP for DL (DL BWP). One or more BWPs may be set in one carrier for the UE.

At least one of the set BWPs may be active and the UE may not assume to transmit or receive a predetermined signal/channel outside the active BWP. Note that "cell", "carrier", and the like in the present disclosure may be read as "BWP".

The structures of the radio frame, subframe, slot, minislot, symbol, and the like described above are merely examples. For example, configurations such as the number of subframes included in a radio frame, the number of slots per subframe or radio frame, the number of minislots included in a slot, the number of symbols and RBs included in a slot or minislot, the number of subcarriers included in the RB, the number of symbols in the TTI, the symbol length, the cyclic prefix (CP) length, and the like can be variously changed.

The terms "connected", "coupled", or any variations thereof mean any direct or indirect connection or coupling between two or more elements, and one or more intermediate elements may exist between two elements "connected" or "coupled" to each other. The coupling or connection between the elements may be physical, logical, or a combination thereof. For example, "connection" may be read as "access". When used in the present disclosure, it can be considered that two elements are "connected" or "coupled" to each other by using at least one of one or more electric wires, cables, and printed electrical connections, and using electromagnetic energy having wavelengths in the radio frequency domain, the microwave range and optical (both visible and invisible) domain, and the like as some non-limiting and non-inclusive examples.

The reference signal may be abbreviated as Reference Signal (RS) and may be referred to as pilot (Pilot) according to the applied standard.

The phrase "based on" as used in the present disclosure does not mean "based only on" unless clearly stated otherwise. In other words, the phrase "based on" means both "based only on" and "based at least on".

The "means" in the configuration of each of the above devices may be replaced with "unit", "circuit", "device", and the like.

Any reference to an element using designations such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some manner.

In the present disclosure, when "include", "including", and variations thereof are used, these terms are intended to be inclusive in a manner similar to the term "comprising". Furthermore, the term "or" used in the present disclosure is intended not to be an exclusive disjunction.

Throughout the present disclosure, for example, if articles such as "a", "an", and "the" in English are added due to translation, the present disclosure may include cases where the noun following these articles is in plurals.

The terms "judging" and "determining" as used in the present disclosure may include a wide variety of operations. "Judging" and "determining" may include, for example, regarding deciding, calculating, computing, processing, deriving, investigating, searching (looking up, search, inquiry) (e.g., searching in a table, a database, or another data structure), ascertaining, and the like as "judging" and "determining". Furthermore, "judging" and "determining" may include, for example, regarding receiving (e.g., receiving information), transmitting (e.g., transmitting information), input, output, and accessing (e.g., accessing data in a memory) as "judging" and "determining". In addition, "judging" and "determining" may include regarding resolving, selecting, choosing, establishing, comparing and the like as "judging" and "determining". That is, "judging" and "determining" may include regarding some operations as "judging" and "determining". Furthermore, "judgement (determination)" may be read as "assuming", "expecting", "considering", and the like.

In the present disclosure, the term "A and B are different" may mean "A and B are different from each other". It should be noted that the term may mean "A and B are each different from C". Terms such as "separated", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

REFERENCE SIGNS LIST 10 radio communication system
50 CU
100A, 100B, 100C radio communication node
161 radio transmitting unit
162 radio receiving unit
165 cell information acquiring unit
170 control unit
UE 200
1001 processor
1002 memory
1003 storage
1004 communication device
1005 input device
1006 output device
1007 bus

The invention claimed is:

1. A radio communication node comprising:
a receiver that receives a control element including an index of an additional time included in a time difference in a downlink direction from Distributed Unit (DU) transmission in a serving cell to Mobile Termination (MT) reception in the radio communication node; and
a processor that determines a calculation formula for calculating the time difference using the index of the additional time provided by the control element, granularity of the additional time and an initial value of the additional time.

2. The radio communication node according to claim 1, wherein the processor configures the granularity according to a frequency range to be used.

3. The radio communication node according to claim 2, wherein the processor configures a granularity coarser than a granularity applied to a first frequency range when using a second frequency range that is higher than the first frequency range in frequency.

4. A radio communication system including a first radio communication node and a second radio communication node, wherein
the first radio communication node comprises a transmitter that transmits a control element including an index of an additional time included in a time difference in a downlink direction from Distributed Unit (DU) transmission in a serving cell to Mobile Termination (MT) reception in the second radio communication node, and
the second radio communication node comprises:
a receiver that receives the control element; and
a processor that determines a calculation formula for calculating the time difference using the index of the additional time provided by the control element, granularity of the additional time and an initial value of the additional time.

* * * * *